United States Patent [19]

Zambrano et al.

[11] 4,238,466

[45] Dec. 9, 1980

[54] ABSORPTION OF SULFUR DIOXIDE FROM GASES BY FERROUS SULFATE

[75] Inventors: Adolfo R. Zambrano; Barry J. Hansen, both of Hibbing, Minn.

[73] Assignee: The Hanna Mining Company, Cleveland, Ohio

[21] Appl. No.: 731,029

[22] Filed: Oct. 8, 1976

Related U.S. Application Data

[63] Continuation of Ser. No. 403,954, Oct. 5, 1973, abandoned.

[51] Int. Cl.$^3$ .................. C01B 17/60; C01G 41/14
[52] U.S. Cl. ................................. 423/244; 423/558
[58] Field of Search ............ 423/558, 244, 659 F, 423/535

[56] References Cited

U.S. PATENT DOCUMENTS

| | | | |
|---|---|---|---|
| 2,086,237 | 7/1937 | Pfanstiel | 423/558 |
| 2,306,425 | 12/1942 | Bevan | 423/558 |
| 3,917,800 | 11/1975 | McGauley et al. | 423/244 |

Primary Examiner—Earl C. Thomas
Assistant Examiner—Gary P. Straub
Attorney, Agent, or Firm—Maky, Renner, Otto & Boisselle

[57] ABSTRACT

This application is directed to the use of ferrous sulfate for absorption of sulfur from gases containing the same. The invention is predicated on the reaction of the sulfur oxides with ferrous sulfate in the presence of oxygen to form principally ferric sulfate.

6 Claims, No Drawings

ABSORPTION OF SULFUR DIOXIDE FROM GASES BY FERROUS SULFATE

This is a continuation of application Ser. No 403,954, filed Oct. 5, 1973, now abandoned.

BACKGROUND OF THE INVENTION

This invention relates generally to a process for the removal of sulfur from gases containing the same. More particularly, the invention relates to the removal of undesirable ingredients in plant waste gases, and to a procedure for removing sulfur oxides from flue and smelter gases, i.e., stack gases from sulfuric acid and elemental sulfur plants, through the use of a solid acceptor for sulfur dioxide.

Air pollution with sulfur dioxide is a major problem in the United States today. Sulfur dioxide is objectionable principally because above relatively low concentrations it is toxic to human beings and animals and is destructive to vegetation. Sulfur dioxide and its oxidation products, sulfur trioxide and sulfuric acid, are a major source of acidity in rain and fog which in turn can be very corrosive.

At the present time, the largest amount of industrial sulfur oxide emissions results from the combustion of certain types of coal and oil which contain appreciable amounts of sulfur. Waste gas streams containing sulfur dioxide similarly are produced by other industrial processes such as in the smelting of sulfur-bearing ores, the refining of sulfur-containing crude oils, the synthesis of sulfuric acid, the sulfonation of hydrocarbons, the production of coke, the production of sulfur in a Claus process, the production of paper by way of a wood-pulping process, and similar industrial processes.

Furthermore, the discharge of these gas streams containing sulfur dioxide into the atmosphere constitutes a waste of a valuable material because the sulfur contained therein is an industrial commodity. Currently, tens of millions of tons of sulfur oxides are released into the atmosphere over populated regions of the United States each year. Thus, the recovery of some of this sulfur dioxide either as such or in another form could result in the accumulation of a supply of useful chemicals of definite value.

Many processes have been proposed for removal of sulfur dioxide from these gas streams. Most of the proposed removal procedures which have been suggested utilize liquid sorption in which the sulfur dioxide containing gases are intimately contacted which an aqueous sorbent which typically contains chemicals in solution or in slurry which will react with the sulfur dioxide and absorb the same into the liquid solution. Examples of such absorbents include the oxides, hydroxides and carbonates of ammonia, the alkali metals, and the alkaline earth metals.

One disadvantage of the wet absorption process is that the absorption of the sulfur dioxide must occur at a rather low temperature. This results in cooling of the gases which are ultimately discharged to the atmosphere. Such cool gases will remain near ground level thus causing pollution of the ambient air at ground level, which may be as serious as that presented by the untreated flue gas.

Other methods have been suggested for removing sulfur oxides from flue gases. Attempts to desulfurize fuels prior to combustion have been costly and not always effective. For some fuels, such as coal, many processes investigated to date do not economically desulfurize fuel.

Additive processes have been suggested wherein materials having the ability to combine with sulfur oxides are added either to the fuel or to the combustion gases. Additives which have been employed include ammonia, soda, limestone, magnesia and magnesite, but such additives generally are costly.

Dry adsorption also has been suggested. Sulfur dioxide can be adsorbed at low temperature by materials such as aluminum oxide, activated carbon, and silica gel. A disadvantage of such adsorption process is that they also require relatively low temperatures and have similar drawbacks to those of the wet absorption process described above.

Solid acceptors which absorb sulfur oxides also have been reported. Examples of such acceptors include alkalized alumina which is converted to the aluminum sulfate and mixtures of alkali metal oxides and iron oxide which are also converted to the corresponding sulfates. One important advantage of these solid absorption processes is that they can be operated at elevated temperatures, and the gas which ultimately is discharged to the atmosphere is at an eleveted temperature and is readily dissipated in the atmosphere. There continues to be a need, however, for solid acceptors which are readily useable in commercial scale absorption processes.

SUMMARY OF THE DISCLOSURE

These and other problems of removing sulfur oxides from waste gases and recovering useable sulfur and sulfur-containing products have been overcome by the process of this invention which comprises contacting the sulfur oxide-containing gas with a solid ferrous sulfate at a temperature from about 300° to about 500° C. whereupon the ferrous sulfate reacts with the sulfur oxides to form principally ferric sulfate. The gas treated in this manner is reduced in sulfur oxide content to acceptable limits, and the ferric sulfate formed can be recovered and further treated as desired.

DESCRIPTION OF THE PREFERRED EMBODIMENTS

In the process of this invention, the waste gases are treated with solid ferrous sulfate which reacts with the sulfur oxides in the waste gases in an oxidizing atmosphere to form ferric sulfate. It has been found that ferrous sulfate is capable of extracting essentially all of the sulfur from dilute sulfur and oxygen-bearing gas. It is believed that the theoretical basis for the absorption process may proceed by a combination of steps which may include either equations 1–4 or equations 5 and 6.

$$FeSO_4 \cdot xH_2O + heat = FeSO_4 + xH_2O \quad (1)$$

$$2FeSO_4 \cdot xH_2O + O_2 + SO_2 = Fe_2(SO_4)_3 + 2xH_2O \quad (2)$$

$$2FeSO_4 + O_2 + SO_2 = Fe_2(SO_4)_3 \quad (3)$$

$$4FeSO_4 + O_2 + 2SO_3 = 2Fe_2(SO_4)_3 \quad (4)$$

$$6FeSO_4 + 3/2 O_2 = 2Fe_2(SO_4)_3 + Fe_2O_3 \quad (5)$$

$$Fe_2O_3 + 3SO_2 + 3/2 O_2 = Fe_2(SO_4)_3 \quad (6)$$

The mechanism of absorption may be different to some extent from that postulated above since there is evidence (X-ray diffraction) that the final bed after absorption of SO₂ contains some Fe₂S₂O₉·xH₂O and FeSO₄ in addition to the Fe₂(SO₄)₃. The X-ray diffraction did not indicate the presence of significant amounts of iron oxides.

The ferrous sulfate utilized in this invention is placed in an absorbing unit containing one or more beds of the ferrous sulfate. The beds may be of the fixed, moving, fluidized, or countercurrent type. The sulfur and oxygen-bearing waste gases pass through these absorbing units and the sulfur oxides react with the ferrous sulfate to form ferric sulfate. The product gas from the absorber is essentially free of sulfur and is suitable for discharge into the atmosphere as a pollution free effluent.

When the ferrous sulfate in the absorbent bed has been converted in significant amounts to ferric sulfate, and the sulfur oxide removal falls below a preselected level, the flow of sulfur and oxygen-containing gas is diverted to permit removal and replacement of the ferric sulfate by fresh ferrous sulfate. Alternatively, the absorption of sulfur oxides by ferrous sulfate may be effected in a continuous manner by continuously feeding ferrous sulfate into the absorption zone and continuously removing the spent sorbent.

The ferrous sulfate utilized in the process can be partially dehydrated ferrous sulfate. The partially dehydrated ferrous sulfate can be prepared with a minimum of oxidation by drying hydrated ferrous sulfate crystals in a stream of gas at a temperature between about 80° to 200° C., and preferably between 120°–180° C. in the bed of fluid bed equipment. The procedure involves the removal of controlled quantities of water to form products containing water at stoichiometric ratios to iron sulfate that are between 0.1 and 4.5, and preferably between 0.3 and 3.0. Alternatively, the dehydration can be accomplished at about 140° C. under a partial vacuum of from about 10 to 20 inches of mercury in stationary or fluid beds.

The absorption process is effective with beds of ferrous sulfate with particle size ranging from $-270$ mesh material to coarser ferrous sulfate material obtained by agglomerating the ferrous sulfate. This agglomerated product, when dried, produces a product of good strength with maximum particle sizes of between 4 and 40 mesh. The ferrous sulfate within this range of particle sizes efficiently absorbs sulfur dioxide. One-quarter inch material also performs well although the use of larger particles can reduce absorption efficiency.

It has been noted that the initial efficiency of the process of the invention is improved if the ferrous sulfate sorbent is subjected to an oxidizing treatment before use. This may be accomplished by passing a stream of gas containing oxygen or air through the bed of sorbent at an elevated temperature. Generally, the oxidation treatment is effected by the passage of the oxygen or air through the bed of sorbent maintained at a temperature of from about 200° to 400° C.

The rate and efficiency of absorption of the oxides of sulfur by the ferrous sulfate is temperature dependent. It has been found that the absorption is very significant from about 300° to about 500° C. and should preferably be performed at a temperature of from about 300° to about 400 C.

As mentioned above, the absorption of the oxides of sulfur by ferrous sulfate is accomplished in the presence of oxygen. An inspection of equations 1–4 would indicate that a ratio of oxygen to sulfur oxide should be at least 1 for proper absorption. If the mechanism of the absorption proceeds by way of the combination of equations 5 and 6, then the ratio of oxygen to sulfur dioxide should be at least 1.5. Accordingly, the process of the invention is carried out utilizing in general a ratio of oxygen to the sulfur oxide content of the gas of at least 1 and preferably higher than 1.5 in order to insure that there is sufficient oxidizing agent present in the event that some unkown mechanism not shown in equations 1–6 may be involved.

The absorption by ferrous sulfate of sulfur oxide-containing gases has been found to be efficient with sulfur oxide concentrations of the gas ranging from about 0.1 to about 5%. It has been found that the ferrous sulfate can effectively absorb these higher concentrations of sulfur dioxide with excellent efficiency of removal. The sulfur dioxide content of these gases is reduced to acceptable limits by the process.

The following examples illustrate the absorption process of the invention. Unless otherwise indicated, all parts and percentages are by weight.

EXAMPLE 1

About 2,000 grams of ferrous sulfate heptahydrate is charged into a vacuum oven in a vacuum of approximately 15 inches of mercury. The temperature within the oven is raised to about 140° C. and maintained at this temperature for 30 hours. After cooling, about 120 grams of the dehydrated ferrous sulfate having a particle size of $-270$ mesh was packed into a reactor consisting of glass tube $1\frac{1}{8}$ inch inside diameter with a perforated tray sealed to it at the bottom. The reactor was positioned inside a three zone 24 inch Lindberg furnace having a 2.5 inch inside diameter. A bed of dehydrated ferrous sulfate 12 inches in height is utilized in this example. The dehydrated ferrous sulfate utilized in this example contains 18.4% sulfur and has a molar sulfur to iron ratio of 1.04.

Through this bed is passed nitrogen gas containing 2% by volume of oxygen and 1% by volume of sulfur dioxide at a flow rate of about 200 ml./minute subsequent to the passage of oxygen to preoxidize the sorbent for a peroid of one hour.

The temperature through the sorbent bed in this example is found to be about 400° C. at the top, 445° C. at the center, and about 395° C. at the bottom of the bed.

The procedure of this example reduces the sulfur dioxide level in the gas to an acceptable limit. At the end of the test (35 hours), analysis of the sorption bed indicated a sulfur to iron ratio of 1.19 at the top, 1.335 in the center and 1.375 at the bottom indicating that of the total ferrous sulfate present in the bed, 32.6% at the top, 62.0% at the center and 72.8% at the bottom had reacted with the SO₂ in the gas.

EXAMPLE 2

The procedure of Example 1 is repeated with the exception that the temperature of the absorption bed is maintained at about 300° C., actual temperature measurements indicating a temperature of 307° C. at the top, 333° C. at the center, and 293° C. at the bottom.

EXAMPLE 3

About 155 grams of the dehydrated ferrous sulfate prepared in Example 1 having a particle size of $-14 +65$ mesh is charged to the absorption apparatus to provide a bed height of 12 inches. Nitrogen gas containing 2% by volume of oxygen and 1% by volume of SO₂ is passed through the absorption bed at a rate of about 200 ml./minute after first passing oxygen through the bed for one hour while maintaining the top of the bed at about 410° C., the center of the bed at about 448° C., and the bottom of the bed at about 390° C. The sorbent is effective to reduce the $SO_2$ in the gas to an acceptable limit. At the end of the test lasting for 41.5 hours, the sulfur to iron ratio is found to be 1.23 at the top of the bed, 1.30 at the center, and 1.225 at the bottom, indicating that of the total ferrous sulfate in the bed 42.7% at the top, 58.3% at the center, and 42.7% at the bottom had reacted with the $SO_2$ present in the gas.

EXAMPLE 4

A load of 2,000 grams of ferrous sulfate heptahydrate is placed in an oven and air is circulated through the oven to effect oxidation of the absorbent during the dehydration process. A charge is heated to 200° C. for 24 hours under an air flow of 1 liter per minute. The particle size of the dehydrated ferrous sulfate is −65 +100 mesh.

About 75 grams of the above dehydrated ferrous sulfate is placed in the absorption apparatus described in Example 1 utilizing a bed height of seven inches. This sorbent has a sulfur content of 18.53% and molar sulfur-to-iron ratio of 1.02. Nitrogen gas containing 2% by volume of oxygen and 1% by volume of $SO_2$ is passed through the bed at a flow rate of about 3,000 ml./minute.

The ferrous sulfate bed is heated so that the center of the bed is at a temperature of about 400° C. and the $SO_2$ and oxygen-containing gas is passed through the bed at this temperature for 1.5 hours. The $SO_2$ level in the gas is reduced to an acceptable level, and at the end of the test, the sulfur-to-iron ratio in the spent sorbent is found to be 1.13 at the top, and 1.158 at the bottom, indicating that of the total ferrous sulfate present in the bed, 22.9% at the top and 28.8% at the bottom had reacted with the $SO_2$ in gas.

EXAMPLE 5

A sample of about 150 grams of dehydrated ferrous sulfate prepared in accordance with the process described in Example 4 is placed in the absorption apparatus described in Example 1 to a bed height of 12.5 inches. Nitrogen gas containing 2% by volume of oxygen and 1% by volume of $SO_2$ is passed through the sorbent bed at a rate of about 200 ml./minute while maintaining the bed at a temperature of about 418° C. at the top, and about 396° C. at the bottom. The $SO_2$ level in the gas is reduced to an acceptable level, and at the end of the test (9 hours), the sulfur-to-iron ratio in the absorption bed is found to be 1.02 at the top, 1.095 at the center, and 1.15 at the bottom, indicating that of the total ferrous sulfate in the bed, 0.0% at the top, 15.63% at the center, and 27.1% at the bottom had reacted with the $SO_2$ in gas.

EXAMPLE 6

The procedure of Example 5 is repeated except that the temperature of the absorption bed is maintained at about 300° C. at the top, 327° C. at the center, and 290° C. at the bottom. This procedure reduces the level of $SO_2$ in the gas to an acceptable level. At the end of the test, the sulfur-to-iron ratio in the bed is found to be 1.07 at the top, 1.07 at the center, and 1.128 at the bottom indicating that of the total ferrous sulfate present in the bed, 10.4% at the top, 10.4% at the center, and 22.5% at the bottom had reacted with the $SO_2$ in the gas.

EXAMPLE 7

The sorbent material in this example is ferrous sulfate which has been dehydrated at a temperature of 110° C. with a minimum of oxidation and which has about two moles of water. The particle size of this dehydrated ferrous sulfate is −8 +28 mesh. The absorption capabilities of this ferrous sulfate is determined by using a one inch diameter glass reactor to hold a stationary bed of about four inches in height. The dehydrated ferrous sulfate obtained by the process described above contains 18.67% sulfur and has a molar sulfur-to-iron ratio of 1.05. The absorption capability of this ferrous sulfate is determined by passing nitrogen gas therethrough containing 10% by volume of oxygen and 5% by volume of $SO_2$ while maintaining the bottom of the bed at a temperature of about 350° C. The gas velocity through the bed is approximately 80 cm/minute, and the gas contact time in this example is 7.5 seconds with an overall absorption time of 2.8 hours. The $SO_2$ level in the gas is reduced to an acceptable level, and the sulfur-to-iron ratio in the absorption bed at the end of the test is found to be 1.205 at the top and 1.27 at the bottom, indicating that of the total ferrous sulfate present 34.5% at the top and 49% at the bottom had reacted with the $SO_2$ in the gas.

EXAMPLE 8

The procedure of Example 7 is repeated except that the nitrogen gas which is passed through the sorption bed contains 2.5% by volume of oxygen and 2% by volume of sulfur dioxide and the absorption time is 6.25 hours.

EXAMPLE 9

A two-stage absorption operation is carried out in a fluid bed reactor utilizing 2,000 grams of dehydrated ferrous sulfate (−48 mesh) to give a bed height of about 17 inches. The gas flow rate is about 1.1 cubic feet per minute at room temperature and 10 psig. At a bed temperature of 350° C., the sulfur dioxide concentration in a gas comprising sulfur dioxide and air is reduced from 1.0% to about 0.10% by this two-stage absorption procedure.

EXAMPLE 10

The procedure of Example 9 is repeated except that a three-stage ferrous sulfate absorbent operation is utilized. The sulfur dioxide concentration of the input gas is reduced from an original 1.0% to 0.4% after the first stage, 0.2% after the second stage, and 0.02% after the third stage.

EXAMPLE 11

The procedure of Example 10 is repeated except that the input gas comprises 1% sulfur dioxide and 2% oxygen in nitrogen. The performance of this three-stage absorption is determined by analyzing the sulfur dioxide concentration in the output gas at each stage which indicates a sulfur dioxide level of 0.35% after the first stage, 0.05% after the second stage, and 0.001% after the third stage. This example illustrates that the absorption of $SO_2$ into ferrous sulfate is very efficient when the gas containing the sulfur dioxide also contains 2% of oxygen.

The above examples demonstrate the utility of the process of this invention in removing the oxides of sulfur from gases containing the same. The process of this invention utilizing ferrous sulfate in the purification of sulfur-bearing gases generates effluent gases that are essentially free of sulfur. The ferric sulfate and other products formed by the absorption of the oxides of sulfur may be decomposed to iron oxides and sulfur dioxide gas, and the sulfur dioxide gas can be utilized in the production of sulfuric acid or elemental sulfur as desired. The iron oxide, sulfuric acid, and elemental sulfur which are obtained from the decomposition of the iron sulfates resulting from the absorption process can be marketed as items of commerce.

The above examples have illustrated the process of the invention with regard to the extraction of sulfur dioxide from a nitrogen gas containing the same. The procedure also is utilized for removing the oxides of sulfur from waste gas streams and various industrial processes such as the smelting of sulfur-bearing ores, the refining of sulfur-containing crude oils, and from stack gases of industrial plants such as power generating stations. In those instances where the waste gases contain a solid waste material such as fly ash, the gas may be subjected to a preliminary treatment to remove such solid materials or the gases containing the solid material may be passed through the absorbent beds of the ferrous sulfate whereupon the solid materials are attached to the surface of the solid ferrous sulfate. This latter method of removing solid material such as fly ash is not as desirable as the former since the fly ash will contaminate the ferrous sulfate and may interfere with the subsequent production of sulfur, sulfur dioxide, sulfuric acid, or ferric oxide.

The embodiments of the invention in which an exclusive property or privilege is claimed are defined as follows:

1. In a process for removing sulfur dioxide from a gas containing oxygen and from about 0.001% to about 5% by weight of sulfur dioxide by contacting said gas with a solid sorbent in an absorption zone at a temperature of from about 300° to about 500° C. to form sulfate-bearing solids and a gas reduced in sulfur dioxide content, the improvement comprising the use of solid ferrous sulfate as the sorbent and maintaining a ratio of oxygen to sulfur oxides in the absorption zone of at least 1.

2. The process of claim 1 wherein the temperature within the absorption zone is from about 300° to 400° C.

3. The process of claim 1 wherein the gas entering the absorption zone contains sulfur dioxide, and oxygen is introduced separately into the absorption zone.

4. The process of claim 1 wherein the ferrous sulfate is sized into particles of maximum size of between 4 and 40 mesh and is utilized in a fluid bed reactor.

5. The process of claim 1 wherein the ratio of oxygen to sulfur dioxide is between about 1 to about 2.

6. The process of claim 1 wherein the solid ferrous sulfate used in the absorption zone is obtained by dehydrating a ferrous sulfate solution or wet crystals of ferrous sulfate to a hydrated ferrous sulfate containing water at a stoichiometric ratio to iron sulfate of from about 0.3 to about 3.0.

* * * * *